(12) United States Patent
Duffield et al.

(10) Patent No.: US 7,936,898 B2
(45) Date of Patent: May 3, 2011

(54) WATERMARKING OF MOTION PICTURE PRINTS

(75) Inventors: David Jay Duffield, Indianapolis, IN (US); William Bennett Hogue, Simi Valley, CA (US)

(73) Assignee: Thomson LIcensing, Boulogne-Billancourt (FR)

( * ) Notice: Subject to any disclaimer, the term of this patent is extended or adjusted under 35 U.S.C. 154(b) by 1239 days.

(21) Appl. No.: 11/578,222

(22) PCT Filed: Apr. 27, 2004

(86) PCT No.: PCT/US2004/013107
§ 371 (c)(1),
(2), (4) Date: Oct. 11, 2006

(87) PCT Pub. No.: WO2004/030339
PCT Pub. Date: Apr. 8, 2004

(65) Prior Publication Data
US 2007/0206020 A1    Sep. 6, 2007

(51) Int. Cl.
*G06K 9/00* (2006.01)
*G06T 1/00* (2006.01)
(52) U.S. Cl. .................................... 382/100; 345/522
(58) Field of Classification Search .................. 382/100, 382/248, 250; 348/460–468; 345/522; 705/50–57; 352/85–90, 133
See application file for complete search history.

(56) References Cited

U.S. PATENT DOCUMENTS 6,456,726 B1    9/2002    Yu et al.
6,809,792 B1 *  10/2004   Tehranchi et al. ............ 352/85
2002/0027612 A1 *  3/2002    Brill et al. ............ 348/473
2005/0238167 A1 *  10/2005   Duffield et al. ............ 380/203
2007/0274561 A1 *  11/2007   Rhoads et al. ............ 382/100

FOREIGN PATENT DOCUMENTS
EP    1213912    5/2001
WO    WO2004/030339    4/2004

OTHER PUBLICATIONS

Yulin Wang et al: "Robust data hiding in MPEG-2 video against transcoding" Proceedings of the 4TH Eurasp Conference, vol. 2, Jul. 2, 2003, pp. 695-700.
Pelly J et al: UMID Watermarking for Managing Metadata in Content Production: SMPTE Journal, SMPTE Inc. Scarsdale, NY US, vol. 110, No. 7, Jul. 2001, pp. 429-435.
Langelaar G. C., Setyawan I: Lagendiji R L: "Watermarking Digital Image and Video Data" IEEE Signal Processing Magazine, IEEE Inc. vol. 17. No. 5, Sep. 2000, pp. 20-46.
John G. Proakis: "Digital Communications, Third Edition" 1995, McGraw-Hill Book Co., XP002311772 p. 413-p. 438.
Sarah Mc Bride: The Hunt for Movie Pirates, Hollywood Test New Tricks, Including Spying on Audience to find camcorders in crowd.

* cited by examiner

*Primary Examiner* — Brian Q Le
*Assistant Examiner* — Mehdi Rashidian
(74) *Attorney, Agent, or Firm* — Robert D. Shedd; Joseph J. Opalach

(57) ABSTRACT

An apparatus for marking a film copy includes a mapper and a coder. The mapper maps a print identifier to be associated with the film copy into a serial number comprising a sequence of J numbers. The coder creates at least two-error correcting numbers, e.g. Y and Z, as a function of one, or more, of the J numbers. The film copy is then marked in accordance with L numbers, which comprise at least the two-error correcting numbers Y and Z.

10 Claims, 10 Drawing Sheets

FIG. 8

*Table One*

| | W | X | Y | Z |
|---|---|---|---|---|
| Scene Start (ft) | | | | |
| Mark Location (ft) | | | | |
| Sequence Number | | | | |
| A | (2Y+Z-4X)*21 | W | W | W |
| B | X | (2Y+Z-3W)*8 | X | X |
| C | (X+Y-Z)*21 | (-W+2Y-Z)*8 | (W+2X-Z)*16 | Y-W-X |

FIG. 9

*Table Two*

| Marks Found | A | B |
|---|---|---|
| W and X | W | X |
| W and Y | W | Y-W |
| W and Z | W | (Z-W)*16 |
| X and Y | Y-X | X |
| X and Z | Z-2X | X |
| Y and Z | 2Y-Z | Z-Y |

WATERMARKING OF MOTION PICTURE PRINTS

This application is a National Stage Application and claims the benefit, under 35 U.S.C. §365 of International Application PCT/US04/13107 filed Apr. 27, 2004, which was published in accordance with PCT Article 21(2) on Dec. 1, 2005 in English. This application is related to copending, commonly assigned, U.S. patent application Ser. Nos. 11/578,903 entitled FILM FINGERPRINTING, filed on Oct. 20, 2006; 11/578,229 entitled FILM FINGERPRINTING, filed on Oct. 11, 2006; 10/833,263 entitled ANTI-PIRACY CODING OF MOTION PICTURES, filed Apr. 27, 2004; and 10/670,682 entitled MOTION PICTURE ANTI-PIRACY CODING, filed Sep. 25, 2003.

BACKGROUND OF THE INVENTION

The inventive arrangements relate generally to the field of protecting motion picture film against illegal copying, and in particular, to an improved method for film encoding to facilitate the identification of the source of copies encoded in accordance with the inventive arrangements.

Piracy issues in connection with the theatrical exhibition of motion picture films are well known. Once a film distributor distributes prints of a motion picture film to exhibitors for theatrical exhibition, a certain degree of control over the product is lost. In the regular course of exhibiting the film, a customer in the theater may surreptitiously record the film using, e.g., a hand held camcorder. At a more sophisticated level, a person seeking to obtain an illegal copy of a film print may gain access to a theater projection booth in collusion with an employee of the exhibitor and make a copy of the film after hours in a relatively controlled environment. In such an environment, the audio from the projection equipment can be directly fed to the camcorder. A tripod can be used to ensure a clear and steady picture. As a result, an illicit copy can be made. Alternatively, the print itself may be scanned to create a video master.

In 1982, the Motion Picture Association of America (MPAA), together with the Kodak Corporation, developed a technology for uniquely identifying film prints. This technology is commonly known as Coded Anti-piracy (CAP) coding. The code is a series of faint dots in the picture that are added as the print is manufactured. Approximately one out of every hundred frames contains four tiny dots that have been added to the image. Generally, 11 CAP-coded frames are required to reconstitute the serial number of the movie print. Each unique configuration of dots corresponds to a print identifier. The film prints are usually coded for each theater in which a film is distributed.

Historically, aiming an analog camcorder at a theater screen produced a poor quality, flickering image, but the coding dots usually survived the copying and reproduction process so that the serial number of the movie print could be obtained. The advent of digital video compression and distribution technologies, however, has diminished the viability of CAP coding. Improved digital camcorders not only take higher quality pictures, but video compression algorithms, which are commonly employed when the pirated film is stored in a digital format or transported over the internet, tend to obliterate the CAP codes. Specifically, because the dots representing the code are extremely small and diffuse, they are susceptible to disintegration during video compression. Furthermore, the loss of a single CAP code dot during image compression can defeat the CAP coding scheme because the CAP code is represented by spatial image placement within the film frame. Therefore CAP coding is dependent upon 100% image survival.

Another limitation of the CAP coding system is that a total of 2023 unique configurations were developed in 1982. At the time, this was sufficient because it was roughly equivalent to the number of theaters in operation at the time and substantially exceeded the number of prints that had been made in connection with even the largest motion picture releases. Today there are over 20,000 theaters worldwide, and major motion picture releases of more than 5,000 prints are increasingly common. Accordingly, there are an insufficient number of codes to uniquely identify each film print that is distributed.

Further, the frequency of code image repetition in CAP coding systems increases the likelihood that the public will see the image. This is undesirable as it can distract viewers from the film content or cause them to form an opinion that a particular theater shows poor quality prints. Accordingly, there is a pressing need for a successor to CAP coding that allows the origin of the piracy to be identified.

SUMMARY OF THE INVENTION

In accordance with the principles of the invention, a sequence of J numbers represents a serial number for a film copy, from which at least two error-correcting numbers, e.g., Y and Z, are created, where each is a function of one or more of the J numbers. The film copy is then marked in accordance with at least the two error-correcting numbers Y and Z.

In an embodiment of the invention, an apparatus for marking a film copy includes a mapper and a coder. The mapper maps a print identifier to be associated with the film copy into a serial number comprising a sequence of J numbers. The coder creates at least two-error correcting numbers, e.g., Y and Z, as a function of one, or more, of the J numbers. The film copy is then marked in accordance with L numbers, which comprise at least the two error-correcting numbers Y and Z.

In another embodiment of the invention, a method for marking a film includes the steps of mapping and coding. The mapping step maps a print identifier to be associated with the film copy into a serial number comprising a sequence of J numbers. The coding step creates at least two-error correcting numbers, e.g., Y and Z, as a function of one, or more, of the J numbers. The film copy is then marked in accordance with L numbers, which comprise at least the two error-correcting numbers Y and Z.

In another embodiment of the invention, a motion picture is disposed on a medium, wherein the motion picture comprises a plurality of frames, each frame representing a portion of the motion picture; and wherein some of the frames are marked to represent an erasure-correcting coded serial number; wherein the erasure-correcting coded serial number comprises L numbers, wherein N of the L numbers represent a portion of a serial number comprising J numbers, where N<J, the serial number being associated with the copy of the motion picture, and the remainder of the L numbers represent error-correcting numbers derived as a function of one, or more, of the J numbers.

In another embodiment of the invention, a motion picture is disposed on a medium, wherein the motion picture comprises a plurality of frames, each frame representing a portion of the motion picture; and wherein some of the frames are marked to represent an erasure-correcting coded serial number; wherein the erasure-correcting coded serial number comprises L numbers, and wherein the erasure-correcting coded serial number enables recovery of a print identifier associated with the copy of the motion picture if M of the L numbers are subsequently missing, where M>1.

BRIEF DESCRIPTION OF THE DRAWINGS

FIGS. 8 and 9 show illustrative tables for use in recovering a print identifier in accordance with the principles of the invention.

DETAILED DESCRIPTION

Motion pictures are commonly distributed to theaters around the world for exhibition. Accordingly, in order to distribute the motion picture to many locations simultaneously, multiple production copies of the motion picture are typically produced on a suitable media. Film is presently the most common media on which motion pictures are distributed to theaters. For example, a feature length film typically consists of anywhere from five to eight reels of film. However, those skilled in the art will recognize that the invention described herein for circumventing piracy of motion pictures is not limited in its application to film media, but can instead be used with any media on which a motion picture can be stored. Such media can include any of a wide variety of existing technologies including DVD, CD ROM, and magnetic disc as well as any other solid state, optical, electro-optical, magneto-optical storage formats as are now known or which may become known in the future.

Figure 1:
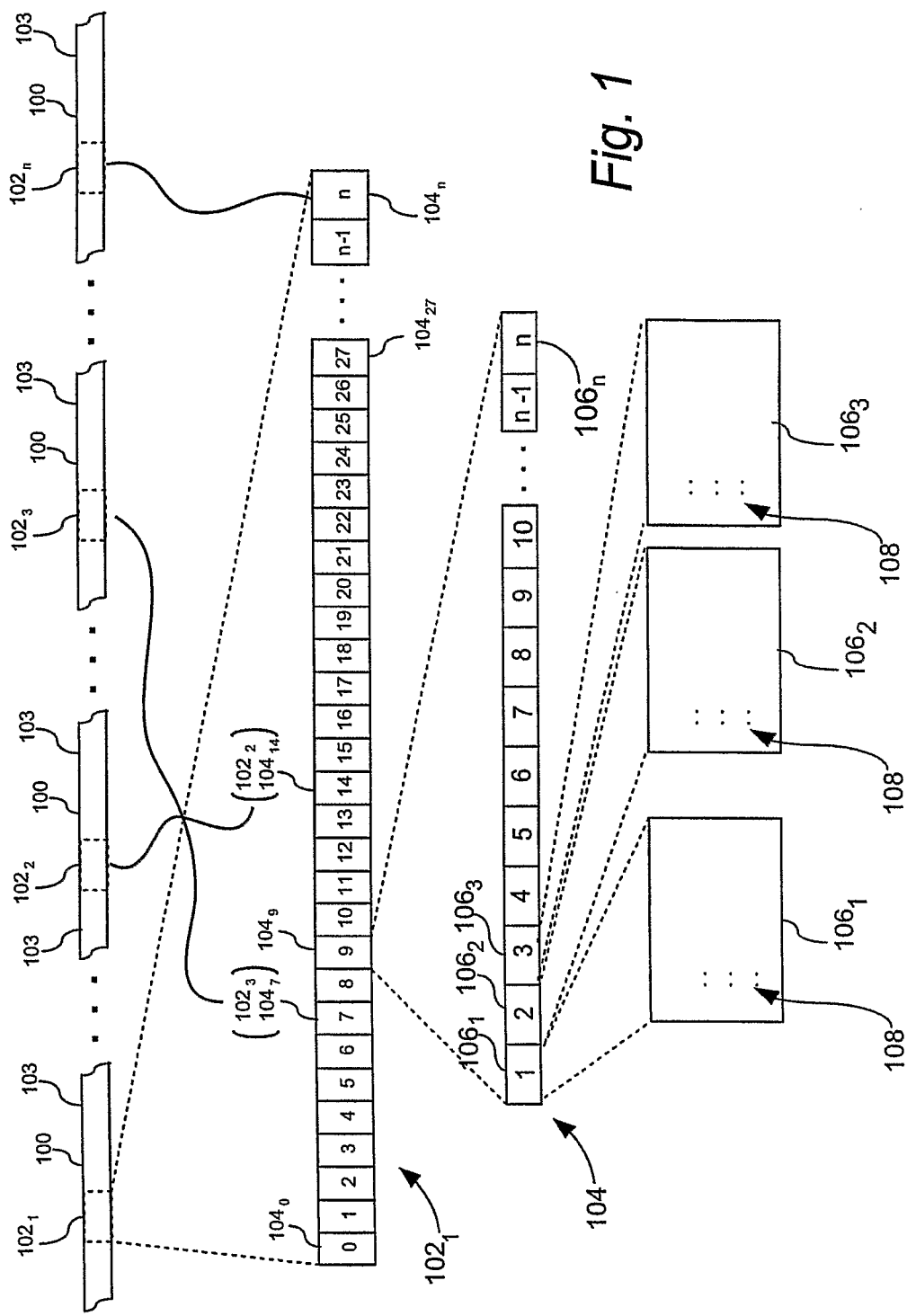
FIG. 1 is a schematic representation of a motion picture stored on a media that is useful for understanding the invention.

FIG. 1 is a representation of a motion picture stored on a medium 100. A process for uniquely identifying each production copy of the motion picture that is printed for distribution to theaters can begin by selecting two or more scenes of the motion picture. Each of the scenes can comprise an identifiable portion of the motion picture distinct from every other portion of the motion picture. In FIG. 1, scenes $102_1$ through $102_n$ are shown, it being understood that the invention is not limited to any particular number of selected scenes.

Once the scenes $102_1$ through $102_n$ have been chosen, two or more sequences 104 can be defined within each of the scenes. The sequences 104 are preferably of equal length and each sequence can include one or more frames 106 that contain image information. For example, within a motion picture, three scenes $102_1$, $102_2$, $102_3$, can be identified and each scene can be divided into twenty eight sequences $104_0$ through $104_{27}$, with each of the sequences containing twelve frames $106_1$ though $106_{12}$. Notably, the number of scenes and the number of associated sequences can be selected to provide a desired number of possible identifier combinations. For example, the number of possible identifier combinations can be equal to the number of sequences $104_0$ through $104_n$ in each scene $102_1$, $102_2$, $102_3$ raised to a power equal to the number of scenes comprising an identifiable portion of the motion picture. For example, if there are three scenes, each with 28 sequences, the number of possible identifier combinations can be $28^3$, or 21,952.

After the scenes $102_1$, $102_2$, $102_3$ and associated sequences $104_0$ through $104_{27}$ have been defined, two or more selected sequences from each scene $102_1$, $102_2$, $102_3$ can be marked with an identifier mark to produce a uniquely identifiable pattern. For example, referring to FIG. 1, a particular motion picture print stored on media 100 can be marked so that in scene $102_1$, sequence $104_9$ is marked; in scene $102_2$, sequence $104_{14}$ is marked, and in scene $102_3$, sequence $104_7$ is marked. The film print can thus be assigned a serial number 9-14-7, corresponding to the number of the sequences marked with identifier marks in each scene. In this way, the particular sequence or sequences marked within each scene define the code that allow a particular production copy of the motion picture to be identified.

Further, an additional scene can be identified for error detection/correction by use of an exemplary check sum, for example depicted as scene $102_n$ in FIG. 1. The error detection/correction scene $102_n$ also can be divided into a number of sequences $104_0$ through $104_n$ equal in length to other selected scenes, for example twenty eight sequences $104_0$ through $104_{27}$. Again, each sequence can contain one or more frames. For instance, each of the sequences can again contain twelve frames $106_1$ though $106_{12}$. One or more of the sequences can be marked with an error detection/correction mark. This mark can correlate to the sequence markings (identifier marking pattern) which allow a particular motion picture print to be identified. In particular, an error correction mark can enable the identifier marking pattern to be determinable in the absence of at least one of the identifier marks. For example, if the identifier mark in a particular scene is unreadable, the error correction mark can be used to determine the value represented by that identifier mark.

In one arrangement, for example where three scenes are selected to contain identifier marks, a desired print identifier "P" can be represented by the uniquely identifiable marking pattern as $P=I_1+I_2M+\ldots+I_nM^{n-1}$, where:

$$I_1 = P \operatorname{Mod} M$$

$$I_2 = \operatorname{Floor}((P/M) \operatorname{Mod} M)$$

$$\vdots$$

$$I_n = \operatorname{Floor}((P/M^{n-1}) \operatorname{Mod} M).$$

The error correction number "E" can be expressed as:

$$E=(I_1+I_2+\ldots+I_n) \operatorname{Mod} M.$$

Using these equations, M is a constant. For example, M can represent the number of defined sequences 104 in each scene $102_1$, $102_2$, $102_3$, $102_n$. Mod returns the remainder of the quotient derived by dividing the operand immediately preceding "Mod" by the operand immediately following "Mod." Floor rounds the remainder down to the nearest integer. $I_1$ through $I_n$ each can be an integer that correlates to an identifier mark, for instance an identifier mark associated with a particular sequence $104_0$ through $104_n$.

If any of the marks correlating to integers $I_1$ through $I_n$ are missing or unreadable, the associated integer can be computed by subtracting the integers correlating to the readable marks from the error correction number "E." This difference then can be divided by the constant "M," and the quotient can be rounded down to the next nearest integer. For example, if there are three integers $I_1$, $I_2$ and $I_3$ correlating to identifier marks, and the mark to which $I_2$ correlates is unreadable, the following equation can be used to determine $I_2$:

$$I_2=(E-I_1-I_3)\text{Mod } M.$$

Equivalently, the associated integer can be computed by subtracting the integers correlating to the readable marks from a sum of the constant "M" multiplied by an integer equal to the number of integers being subtracted in the formula and the error correction number "E". Again, this difference then can be divided by the constant "M," and the quotient can be rounded down to the next nearest integer. For example, if there are three integers $I_1$, $I_2$ and $I_3$ correlating to identifier marks, and the mark to which $I_2$ correlates is unreadable, the following equation can be used to determine $I_2$:

$$I_2=(2M+E-I_1-I_3)\text{Mod } M.$$

In this example M is multiplied by two because there are two integers ($I_1$ and $I_3$) that are being subtracted. This form of the equation can eliminate potential problems which may arise due to negative modulo arithmetic.

The following are specific examples of error correction implementation.

Example #1

Assume there are three scenes selected for the identifier marking pattern, each having 28 sequences. Assume a print identifier of 659 is used. Thus,

P=659

M=28

$I_1$=P Mod M=15

$I_2$=Floor((P/M)Mod M)=23

$I_3$=Floor((P/M²)Mod M)=0

$E=(I_1+I_2+I_3)\text{Mod } M=10.$

An identifier mark can be applied to a sequence $104_{15}$ in a first scene, a sequence $104_{23}$ in a second scene, and a sequence $104_0$ in a third scene. An error correction mark can be applied to a sequence $104_{10}$ in a fourth scene. If the identifier mark placed in third scene is not readable, $I_3$ can be computed as $$I_3=(2M+E-I_1-I_2)\text{Mod } M=(2*28+10-15-23)\text{Mod } 28=0.$$

Example #2

Assume there are four scenes selected for the identifier marking pattern, each having 36 sequences. Assume a print identifier of 79,636 is used. Thus,

P=79,636

M=36

$I_1$=P Mod M=4

$I_2$=Floor((P/M)Mod M)=16

$I_3$=Floor((P/M²)Mod M)=25

$I_4$=Floor((P/M³)Mod M)=1

$E=(I_1+I_2+I_3+I_4)\text{Mod } M=10.$

An identifier mark can be applied to a sequence $104_4$ in a first scene, a sequence $104_{16}$ in a second scene, a sequence $104_{25}$ in a third scene, and a sequence $104_1$ in a fourth scene. An error correction mark can be applied to a sequence $104_{18}$ in a fifth scene. If the identifier mark placed in second scene is not readable, $I_2$ can be computed as $I_2=(2M3M+E-I_1-I_3-I_4)\text{Mod } M=(23*36+10-4-25-1)\text{Mod } 36=16$.

Nonetheless, the invention is not limited to the specific arrangements contained herein. Any number of scenes can be selected to contain identifier marking pattern and any number of sequences can be selected.

The marking process can include the step of marking one or more frames 106 that are contained within a particular sequence $104_n$. In one arrangement, a same marking pattern can be used for each of the identifier marks and the error correction mark. In another arrangement, a different mark can be used for each scene, depending on which integer the scene represents in the identifier marking pattern. Further, a different mark can be used for the error correction mark.

According to a preferred embodiment, between two to five consecutive frames can be marked anywhere within the sequence. For example, the first three frames appearing in a sequence can be marked. The marking can be accomplished by modifying the medium to cause a mark to be associated with a particular frame. Consequently, when the image associated with such frame is displayed, the mark will be visible. The mark which is formed can include a constellation of dots. Each of the dots can have a profile corresponding to a predetermined shape which can be any suitable polygon, circular, elliptical shape. The color of the marking can be selected to enhance a contrast with an image associated with a frame so that the marking can be more easily detected at a subsequent time. Further, the constellation of dots can be varied by production location. Consequently, a uniquely identifiable constellation of dots can be associated with individual ones of a number of production locations. In this way, the constellation can also identify a particular production or printer location as well as the source or origin of the copy theft.

According to one embodiment of the invention, the motion picture scenes $102_1$ through $102_n$ can be selected so that they are separated from each other by a buffer section 103 of the motion picture comprising one or more frames. Further, the motion picture scenes can be selected by identifying portions of the motion picture that tend to lessen the potential that a mark will be noticed by a viewer. Scenes having a substantial amount of action therein can be advantageous as the viewer's eye is drawn to the motion in the scene and is therefore less likely to notice the mark. However, scenes that include panning motion are less desirable because the mark will appear stationary as the background in the scene moves with the camera pan. This is a disadvantage as it tends to draw attention to the mark. The motion picture scenes can also be advantageously selected by identifying portions of the motion picture that have density, lighting and/or coloration characteristics that enhance the visibility of the marking pattern.

According to another aspect of the invention, each of the sequences within each scene can correspond to a number. In that case, the marking step can include marking respective ones of the sequences in each of the scenes so that the combination of the numbers assigned to the sequences that are marked correspond to a film print identification number assigned to the particular copy. The method can also include varying the marking pattern for each copy of the motion picture that is produced so that no two copies of the motion picture have the same marking pattern.

The mark that is applied to a frame can include any modification of the media that will produce a visually identifiable feature when the frame is displayed. For example, the feature can be a single dot, a constellation or grouping of dots arranged in a particular pattern, a pattern of straight or curved lines and any combination thereof. Dots can be of any particular shape including circles, ovals, ellipses, polygons, and any other regular or irregular shape. Even a mark that appears to be a random scratch can be used for this purpose, provided that the scratch is readily identifiable when the frame is displayed. According to one embodiment, the choice of mark can be without limitation, except to the extent that it can be identified at a later time. This can be a significant advantage because the marks can be formed in such a way as to be relatively difficult to identify and remove by illicit copiers. Alternatively, the mark itself can be coded in such a way as to have some further meaning.

Figure 2A:
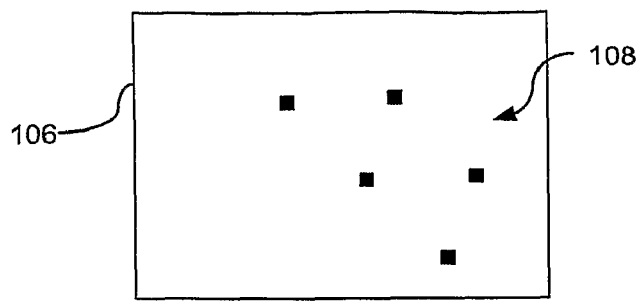
FIGS. 2A and 2B are diagrams that are useful for showing how different markings can be used to mark different prints of a film.
Figure 2B:
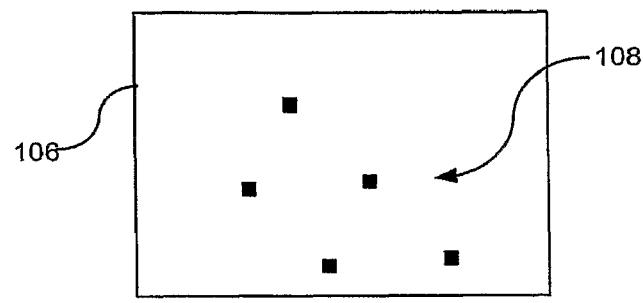

For example, where there exists more than one laboratory or production facility where prints are made, the mark can be used to identify the particular printer location. In that case, different production locations can be assigned different marks. This concept is illustrated in FIGS. 2A and 2B. FIG. 2A shows a frame 106 that includes a mark 108 that is comprised of a constellation of dots. The arrangement of the dots forming the constellation in FIG. 2A can signify a first production location. In contrast, FIG. 2B shows a frame 106 with a second mark 108 comprised of a constellation of dots having a different arrangement that can be used to identify a second production location.

Figure 3:
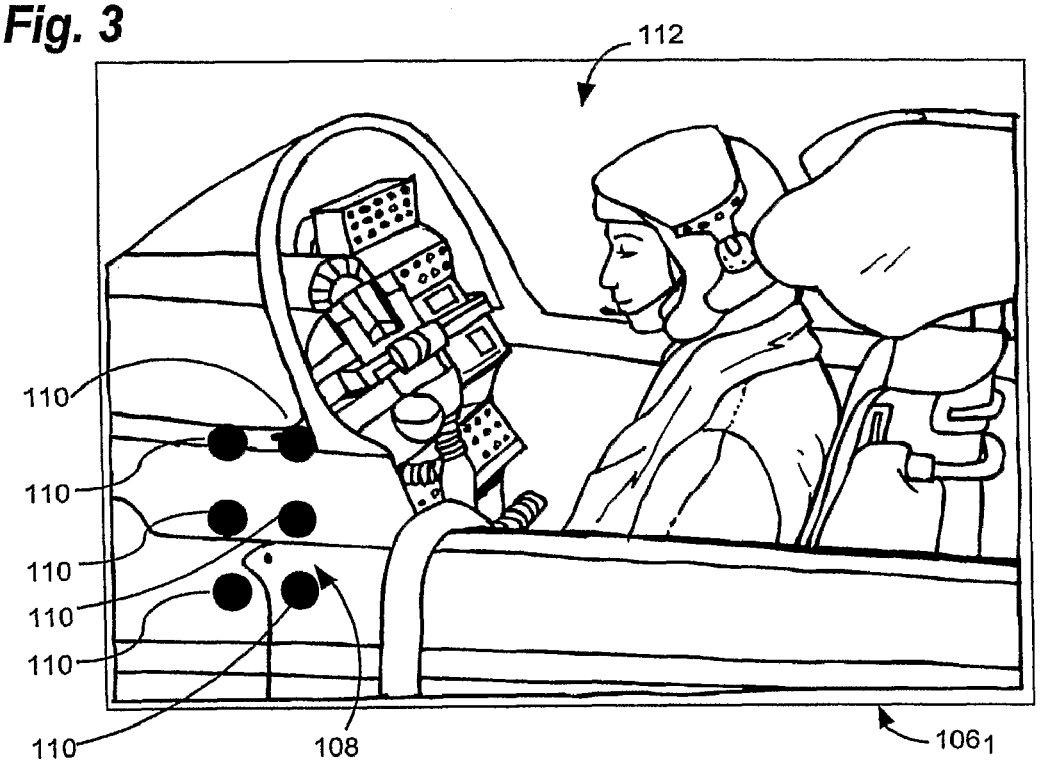
FIG. 3 shows a frame containing an image that has been marked.

Referring to FIG. 3, the mark 108 can be advantageously selected so that it is not readily apparent to a viewing audience. Accordingly, it can be desirable in that case to choose a mark 108 such that its individual elements, such as dots 110 or lines, are relatively small in size. Of course, the mark must be of sufficient size so as to be observable when the frame image 112 is subsequently reviewed in an illicit copy. Further, the color of the mark or dots can be selected so that it provides only enough contrast with the motion picture image of the frame $106_1$ on which the mark has been placed so as to be clearly identifiable when the image 112 contained in the frame $106_1$ is displayed. The color of the mark can also be varied for different scenes for this purpose. However, the invention is not limited in this regard and a single color could be used for all marks appearing in the various sequences and scenes.

A single frame could be used to mark a particular sequence for the purpose of encoding the particular production copy of a motion picture. However, this can be a disadvantage because modern video compression techniques employed with certain types of copying devices can partially or completely remove such markings when they appear only in a single frame. Referring again to FIG. 1, it can be advantageous for the purposes of the present invention to mark a plurality of consecutive frames 106 within a particular sequence 104, using the same mark having the same relative position within each frame. This consecutive marking will help ensure that the marks survive any video compression algorithm applied during the creation and/or distribution of legitimate or illicit copies.

Increasing the number of consecutive marked frames can have drawbacks. In particular, increasing the number of consecutive frames that are marked tends to increase the likelihood that a viewing audience will become aware of their presence. This can detract from the enjoyment of the motion picture or create the impression that a particular theater does not show high quality films. Furthermore it can alert those who illicitly record the motion pictures to the presence of the marks. In this regard, it has been found that two to five and preferably three consecutively marked frames strikes a satisfactory balance between audience distraction whilst maintaining sufficient robustness of the marks. However, it will be appreciated that more or fewer marked frames can be used and the invention is not limited to any particular number of consecutively marked frames.

The same or different marks can be used in different scenes 102. However, marks used within a particular sequence 104 on a plurality of consecutive frames are advantageously made substantially similar to one another to avoid being lost when video compression techniques are applied during subsequent illicit copying or transmission of the motion picture.

Frames can be marked using any suitable method appropriate for the media on which the motion picture is recorded. For example, if a particular production copy of the motion picture is recorded on a film media, then the image on a frame of the film can be modified in a manner similar to that which is used with conventional CAP coding. Such techniques are well known in the art. Still, those skilled in the art will appreciate that there are a wide variety of well known methods for placing an identifiable mark on one or more motion picture film frames that will be visible when the frame is displayed and the invention is not limited to any particular method. For example, the mark can be added to the film media at the time the film is printed. The marking can be accomplished using lasers to embed the mark, a film strip projector or slide projectors to overlay the mark on the film stock, a digital light projector (DLP) or any other suitable means to create on a particular frame of a film print an image corresponding to the desired mark.

Other, less sophisticated, means also can be used to mark the film stock. For example, a scratch tool could be used to manually scratch the mark into the film at the appropriate locations. However, this type of manual marking can lead to inconsistencies in the mark and therefore is not the preferred manner of marking. Marks can also be applied to the film directly with ink.

If the motion picture is digitally recorded, then the digital data associated with such recording medium can be modified in such a way as to produce the selected mark. For example, conventional DVD media can be modified so that a selected image will be caused to be overlaid on the image associated with one or more frames. If the selected image is the desired mark, then those particular frames within a marked sequence will appear to have the mark superimposed thereon when displayed. This image would be reproduced if the motion picture was recorded using a camcorder or other type of video recording device. Of course, those skilled in the art will appreciate that the particular type of recording media and compression scheme will affect the manner in which the digital data is modified and such methods are within the ordinary skill in the art. In this regard, the invention is not limited to any particular digital recording medium, video compression scheme, or method of modifying the digital media to associate the mark with the selected scenes of the motion picture. Any suitable method can be used to modify the digital data of the media in order to add the mark to a frame of the motion picture. Further, it should be noted that the word frame as used herein can include interlaced as well as non-interlaced video frames.

Notably, the coding process described herein can be repeated multiple times at various different locations on the media 100 on which the motion picture is disposed. In that case a second group of scenes 102 can be selected, each comprising an identifiable portion of the motion picture distinct from every other portion of the motion picture. As with the first group of scenes, two or more sequences 104 can be defined within each of the second group of motion picture scenes, with each of the sequences including two or more frames 106. Thereafter, the method can continue as described above, by marking at least one of the sequences from each of the second group of scenes to repeat the uniquely identifiable marking pattern. Alternatively, if the second group of scenes is contained on a second reel of film, a different coding pattern can be used.

Figure 4:
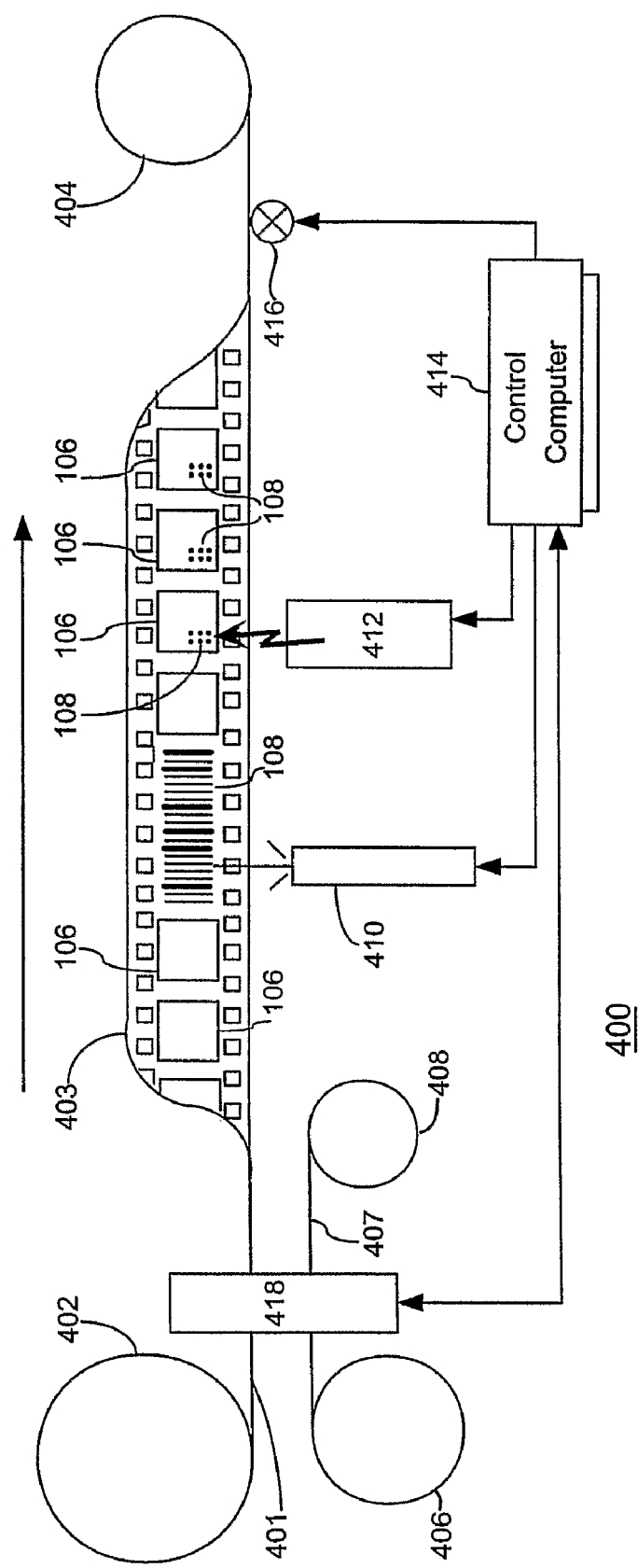
FIG. 4 is a block diagram that is useful for understanding an apparatus of the invention for marking a motion picture.

The invention can also include an apparatus for producing a motion picture disposed on a film media that includes the anti-piracy coding. Referring to FIG. 4, the apparatus 400 can create a coded production copy of a motion picture from a motion picture film negative 407. The apparatus can include a control computer 414 communicating with an encoder 416 and a marking device 412. A production copy of a motion picture can be created from a reel 402 of unexposed film stock 401 by passing the film through a printer 418. Printer 418 can be any of a variety of commercially available film print machines that is capable of creating a motion picture film print from film negative 407. Film negative 407 can be passed from reel 406 containing film negative to be printed, to reel 408 that spools film negative that has already been printed. Similarly, film stock 401 can be transferred from reel 402 containing unexposed film stock to reel 404 containing film that has been printed. Film stock 401 is passed through the printer 418 concurrently with film negative 407 and each frame of the film negative is transferred to the unexposed film stock 401 in the conventional manner well known to those skilled in the art.

As the motion picture images are transferred frame by frame from film negative 407 to film stock 401, the number of frames 106 that have been printed can be counted using information provided by encoder 416. Encoder 416 can be any of a variety of commercially available devices capable of counting frames 106 as the film is spooled from reel 402 to reel 404. For example, the encoder can be a sprocket wheel that engages sprocket holes in the print film 401. A shaft (not shown) can be optically encoded so that its rotation can be counted using an electro-optical sensor. Alternatively, any other type sensor including an electrical, electro-optical, mechanical or electro-mechanical sensor can be used for this purpose, provided that it is capable of communicating information to control computer 414 that directly or indirectly relates to the number of frames of film that are passed over the sprocket.

The code number corresponding to each production copy of a motion picture can be added to the media on which the production copy is disposed. For example, according to one embodiment, a scannable bar code can be burned onto the film stock using a laser 410. This can allow for convenient identification of the particular production copy without searching for the anti-piracy coding marking as described herein. The barcode can be located in the leader area of the printed reel of film. Alternatively, the barcode can be placed onto the areas outside of or between the perforations in the film. Such placement can be advantageous for preventing the barcode from becoming visible to an audience viewing an exhibition of the motion picture. The laser 410 can be controlled by control computer 414 to produce the proper bar code on each film corresponding to the anti-piracy markings that have or will be added.

The present invention can be realized in hardware, software, or a combination of hardware and software. Control computer 414 can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system arranged as shown in FIG. 4 is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Control computer 414 can be provided with information regarding specific portions of the production copy of the motion picture that are to be marked. This information can be provided in any one or more of several different ways. According to one embodiment, the control computer can be provided with specific frame numbers relative to a reference point (e.g. the beginning of the motion picture) that are to be marked. Alternatively, the control computer can be provided with specific physical locations that are to be marked relative to the beginning of the film print. These specific physical locations can correspond to a set of frames within the sequence that is to be marked. In another embodiment, the control computer 414 can be provided with information identifying the scenes (e.g. by a range of frame numbers) within the film that are to be marked, the number of sequences within each scene, and the particular code number assigned to the particular production copy of the motion picture. The control computer 414 can then use this information to automatically identify the frame numbers that are associated with each sequence 104, and the specific sequence of frames that need to be marked in order to code the particular production copy of the film with the code number that has been assigned to it.

The control computer can also be programmed with information relating to the number of consecutive frames to be marked within each of the sequences, and the location of the frames (e.g. first three frames) that are to be marked within each marked sequence. Control computer 414 can control the selection of frames that are marked based on information provided by encoder 416 and control information from printer 418 regarding the number of frames that have been printed relative to some reference point such as the beginning of the film.

In FIG. 4, the marking process is shown occurring immediately after the printing process. However, those skilled in the art will appreciate that the invention is not limited in this regard. For example, the marking could be performed anytime before or after the motion picture is transferred to the film stock 401. The invention is also not limited to the precise arrangement shown in FIG. 4. For example, the marking device could conceivably be arranged to mark the film stock 401 before the film is fed to the printer 418.

Figure 5:
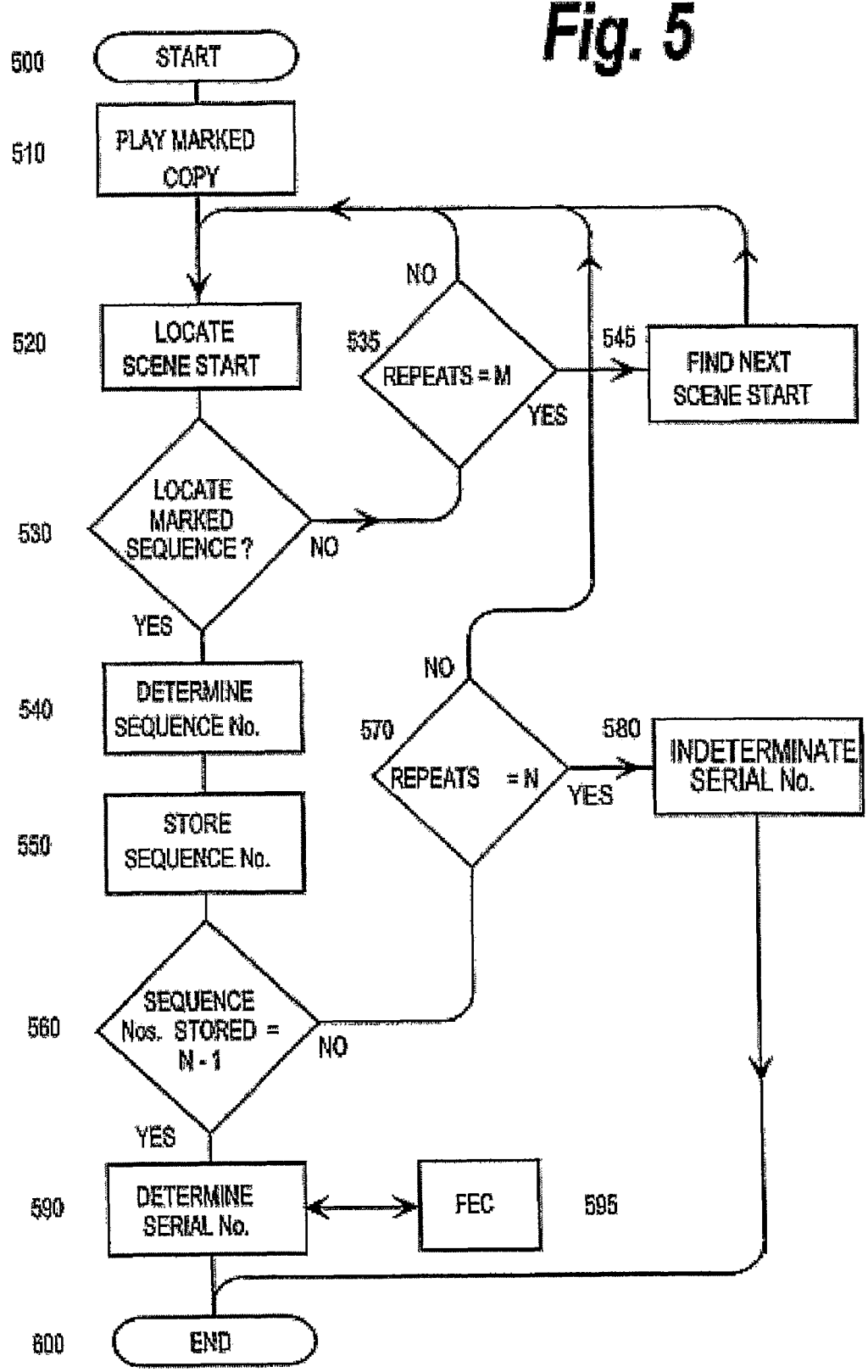
FIG. 5 is an exemplary sequence for serial number recovery from a motion picture print copy serialized in accordance with various inventive arrangements.

An exemplary serial number recovery sequence is shown in FIG. 5, where a print copy, serialized in accordance with the inventive arrangements, is analyzed to determine and reconstruct the serial number of the original film print. The print copy may be stored on various media such as film, magnetic tape or disc, optical disk, solid state memory or the like and may consequently be impaired requiring error detection and correction in addition to serial number recovery. Error detection and correction is performed in the event that part or parts of the print identifying marks are absent or rendered indeterminate.

Serial number determination starts at block 500 with the storage medium being played or read out at block 510. The storage medium may be played, searched or addressed to find a start scene location, depicted as block 520 in FIG. 5, and scene $102_1$ in FIG. 1. Although the location of each scene within the film print is known to the original print maker, the specific frame count or footage location may not be faithfully replicated in a copy whether illicit or legitimate. Hence the determination of successive start scenes, for example $102_1$, $102_2$, $102_n$ etc. may necessitate operator scrutiny.

Locating the occurrence of marked frames $106_1$, $106_2$, $106_3$ present in respective sequences $104_1$, $104_2$, $104_n$ of FIG. 1 is performed at decision block 530 of FIG. 5, and may be performed automatically but may also necessitate further operator scrutiny since the sequence location marks within each scene are specific to each individual serial number. If decision block 530 is satisfied (YES) the process continues at block 540. However, if the sequence mark is not located, block 530 indicates NO and forms a loop via decision block 535 to block 520 to either relocate and re-search the initial scene termed a recursive search or to locate and search another scene termed a non-recursive search. For example, this loop can represent an automated or operator search or a combination where for example, an automated system performs a initial check to establish the presence of a sequence mark and in the event of failure to detect the mark signals for human mark recognition as a final step before abandoning a particular scene and proceeding to the next marked location.

The number of loops traversed to determine sequence marks is counted and tested for equality to a predetermined value M at decision block 535. For example if two attempts are permitted M=2, thus when block 535 tests YES the two attempts have failed and block 545 causes the next scene start to be located at block 520. Once again decision block 530 identifies the location of the next marked frame sequence as has been described.

Automated marking pattern recognition can be performed when the original print copy is marked as described previously, for example with a prescribed constellation of dots, of specific shapes and or colors. Having located one or more of the marked frames (106) the actual sequence number can be determined, at block 540, relative to the beginning of the specific scene with this sequence number stored at block 550. For example, in FIG. 1, scene $102_1$ is depicted with marked frames ($106_1$, $106_2$, $106_3$) occurring in the ninth sequence ($104_9$), thus sequence number 9 is stored at block 550.

At block 560 a test is performed to determine if all the required sequence numbers forming the serial number and check sum have been recovered and stored. For example in FIG. 1, the number of serial number components N represents 4 where three components identify the serial number with the fourth representing the error detection/correction code number. If block 560 tests NO a loop is formed via block 570 which repeats blocks 520 through 570 to locate the sequence numbers until block 560 tests YES.

Having determined and stored all the required serial number components, the serial number of the print from which the subject copy (510) was made can be determined (at block 590) by suitable calculation not shown but described previously, with the serial number determination process ending at block 600.

An error correction code, for example a check sum, is included with the sequence numbers to allow recovery of the serial number despite a defective or poorly resolved sequence mark. At block 595 a forward error correction calculation can be performed using stored sequence number data from a memory associated with storage block 550. Error correction calculation, as previously described can be invoked by the absence of any one of the serial number determining components. However, for error correction to be performed some number of the serial number determining components plus the error correction code must have been recovered and stored.

Returning to block 560 testing NO. Since the exemplary number of serial number components (N) is 4 the repeat loop formed via block 570 must traverse blocks 520 through 570 no more than 3 times or more generally (N−1). Thus at decision block 570 a test is performed to determine if the number of repeat loops has exceeded N which is indicative of a failure to determine and store one or more of the serial number and or error correction code components. If decision block 570 tests YES the serial number is indeterminate and the process is terminated at end block 600.

As has been described, an error detection and correction code is advantageously included as part of each serialized motion picture print copy with FIG. 1 depicting the FEC code within a final scene. However, the scene start or temporal location of this error correction code is in no way limited to the location depicted. The advantageous FEC code can be arbitrarily located at any scene start location within the print copy with the location chosen based on criteria similar to that employed for the serial number scene locations. Clearly to enable serial number recovery from subject copy it is necessary to know not only the number of serial number components, their respective scene start locations but also the serial number component order. For example whether the FEC code is located after or ahead of the serial number components or possibly interleaved therewith. Furthermore a database which relates print serial number or bar code with exhibitor location will in addition provide the required title specific meta data to enable serial number derivation. The exemplary sequence of FIG. 5 represents a sequence of events to be realized by operational use of hardware, software, or a combination of hardware and software.

As described above, and in accordance with the inventive concept, a print identifier is mapped to an erasure-correcting coded serial number for use in tracking the copy of the motion picture. The copy of the motion picture is then marked in accordance with the erasure-correcting coded serial number. Illustratively, the erasure-correcting coded serial number is mapped to particular sequences of the copy of the motion picture and at least one frame of each particular sequence is marked with an identifier.

Figure 6:
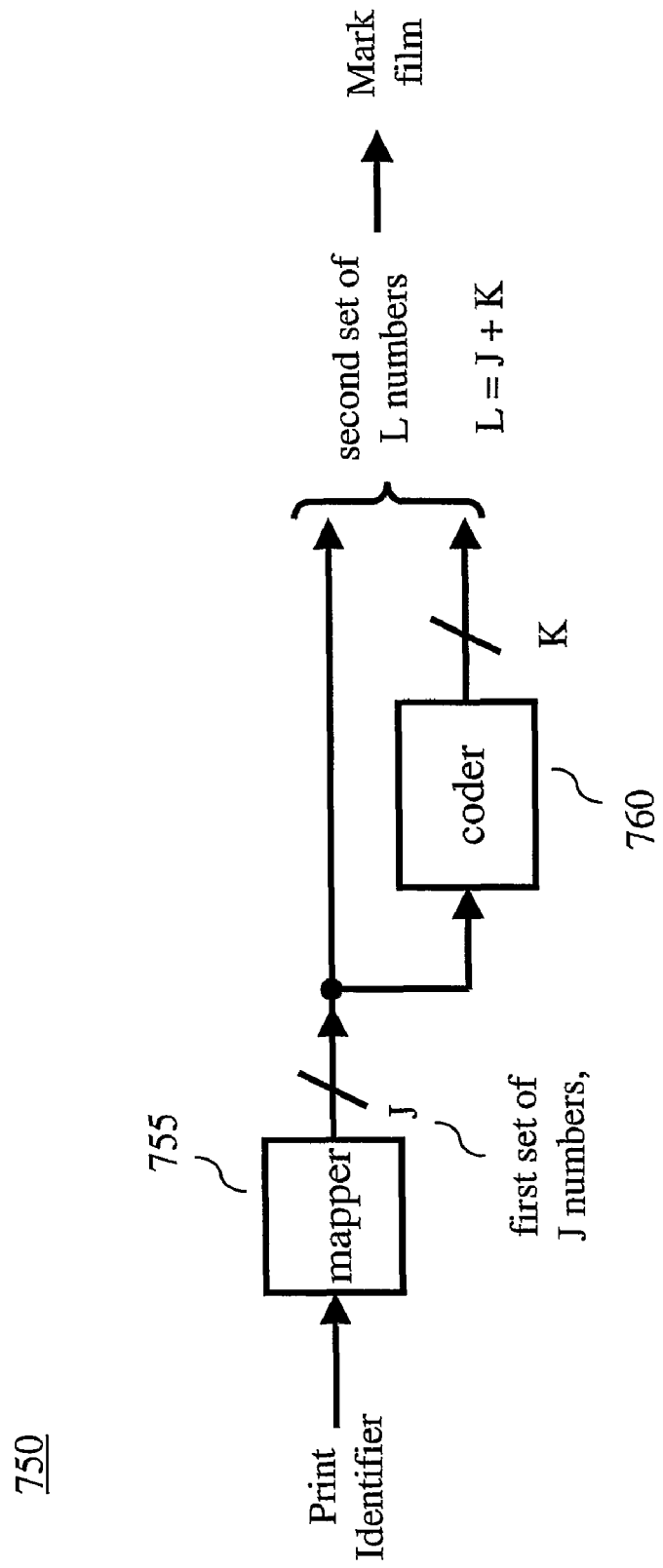
FIG. 6 shows an illustrative encoder for marking film in accordance with the principles of the invention.

An illustrative block diagram of an encoder 750 in accordance with the principles of the invention is shown in FIG. 6. Encoder 750 comprises a mapper 755 and a coder 760. Mapper 755 maps (or encodes) a print identifier into the first set of J numbers. Coder 760 operates on at least a portion of this first set of numbers to provide a number of error correction numbers, K, where K>0. These error correction numbers are also referred to herein as redundant data. The second set of L numbers comprises the error correction numbers, K, along with the first set of J numbers. As a result, $L=J+K.$ The second set of L numbers represents the sequence of numbers used to mark the copy of the film.

It should be noted that it is not necessary for the marks to represent exclusively error correction values or print identifier values. In accordance with the principles of the invention, error correction and identifier values can be mixed. Indeed, other, more flexible codes may also be created. For example, it might be desirable to create a code that would allow films with only a few serial numbers to be decoded such that if M marks are missing, where M>1, the print identifier can still be recovered. This could be desirable in the context of marking a limited production run, e.g., if only a limited number of copies were produced (e.g., 500). In this context, an illustrative code is described below where error correction and identifier values are mixed. Alternatively, this illustrative code can also be used to recover a print identifier even if two marks are missing.

Again, let P equal a print identifier number. This print identifier, P, is then encoded, or mapped, into a first set of J numbers. Illustratively, J=3, i.e., the print identifier, P, is encoded into three numbers, A, B and C, as illustrated below.

$$A=P \bmod M;$$

$$B=\mathrm{Floor}(P/M) \bmod M; \text{ and}$$

$$C=\mathrm{Floor}(P/M^2) \bmod M.$$

In addition, this first set of numbers is further mapped, or encoded, into a second set of L numbers (also referred to herein as an erasure-correcting coded serial number). Illustratively, L=4, i.e., the first set of numbers is encoded into four numbers, W, X, Y and Z, as illustrated below.

$$W=A;$$

$$X=B;$$

$$Y=(A+B+C) \bmod M; \text{ and}$$

$$Z=(A+2B-2C) \bmod M.$$

The second set of numbers represent the particular sequence numbers that are marked in the film copy in the following order: W, X, Y and Z. It can be observed from the equations used to determine the second set of numbers that identifier values and error correction values are mixed. In particular, the identifier value C of the first set is mixed into the values of Y and Z of the second set. These latter values are used to provide error correction. In other words the second set of L numbers only includes N numbers of the first set of J numbers, N<J. The remainder of the J numbers, R, are derived as a function of one, or more, of the J numbers. In this example, Y and Z are derived as a function of all three numbers: A, B and C.

In terms of recovering the print identifier from a marked copy of the film encoded as shown above, the illustrative flow chart of FIG. 7 is used in conjunction with table one of FIG. 8. In steps 705 and 710 of FIG. 7, the scene start for each mark is determined and the location of the mark in each scene is determined, respectively. In step 715, the difference is divided by the offset per sequence value. In step 720, any three marks associated with the second set of numbers are found. From these three marks, the missing sequence number is identified and the first set of numbers is recovered in step 725. Turning briefly to FIG. 8, table one illustrates a set of equations for determining the missing sequence number. In particular, once the missing sequence number is identified, that set of equations in the associated column of table one is used to determine the first set of numbers. It should be noted that any results from the equations shown in table one are further reduced Mod M. Returning to FIG. 7, once the first set of numbers is determined, then the print identifier is recovered in step 730 in accordance with the following equation:

$$P=A+(3*B)+(961*C).$$

In the context of a further illustration, assume M=31, i.e., mod 31 is used. Further, assume that a print identifier, P, is equal to 15,152. As such, using the equations noted immediately above, the print identifier, P, is encoded into the following first set of numbers:

A=24;

B=23; and

C=15.

This first set of numbers is then further encoded into the following second set of numbers:

W=24;

X=23;

Y=0; and

Z=9.

As such, a copy of the film to be associated with the print identifier 15,152 would be marked in accordance with the sequence numbers 24, 23, 0 and 9.

When attempting to recover the second set of numbers from the copy of the film, assume that only the numbers X, Y and Z were found, i.e., W is missing. From table one of FIG. 8, the set of equations in the column associated with W is used to recover the first set of numbers, as shown below:

$$A=(2*0+9-4*23)*21=-1743=24 \bmod 31.$$

B=23; and $$C=(23+0-9)*21=294=15 \bmod 31.$$

Once the first set of numbers is determined, the print identifier, P, is recovered:

$$P=24+23*31+15*961=15,152.$$

If the number of film copies is less than 960, and further in accordance with the principles of the invention, the above-identified code can be used to recover a print identifier even if two marks are missing. Again, assume M=31, i.e., mod 31 is used. Further, assume that a print identifier, P, is equal to 123. As such, using the equations noted immediately above, the print identifier, P, is encoded into the following first set of numbers:

A=30;

B=3; and

C=0.

This first set of numbers is then further encoded into the following second set of numbers:

W=30;

X=3;

Y=2; and

Z=5.

As such, a copy of the film to be associated with the print identifier 123 would be marked in accordance with the sequence numbers 30, 3, 2 and 5.

Figure 7:
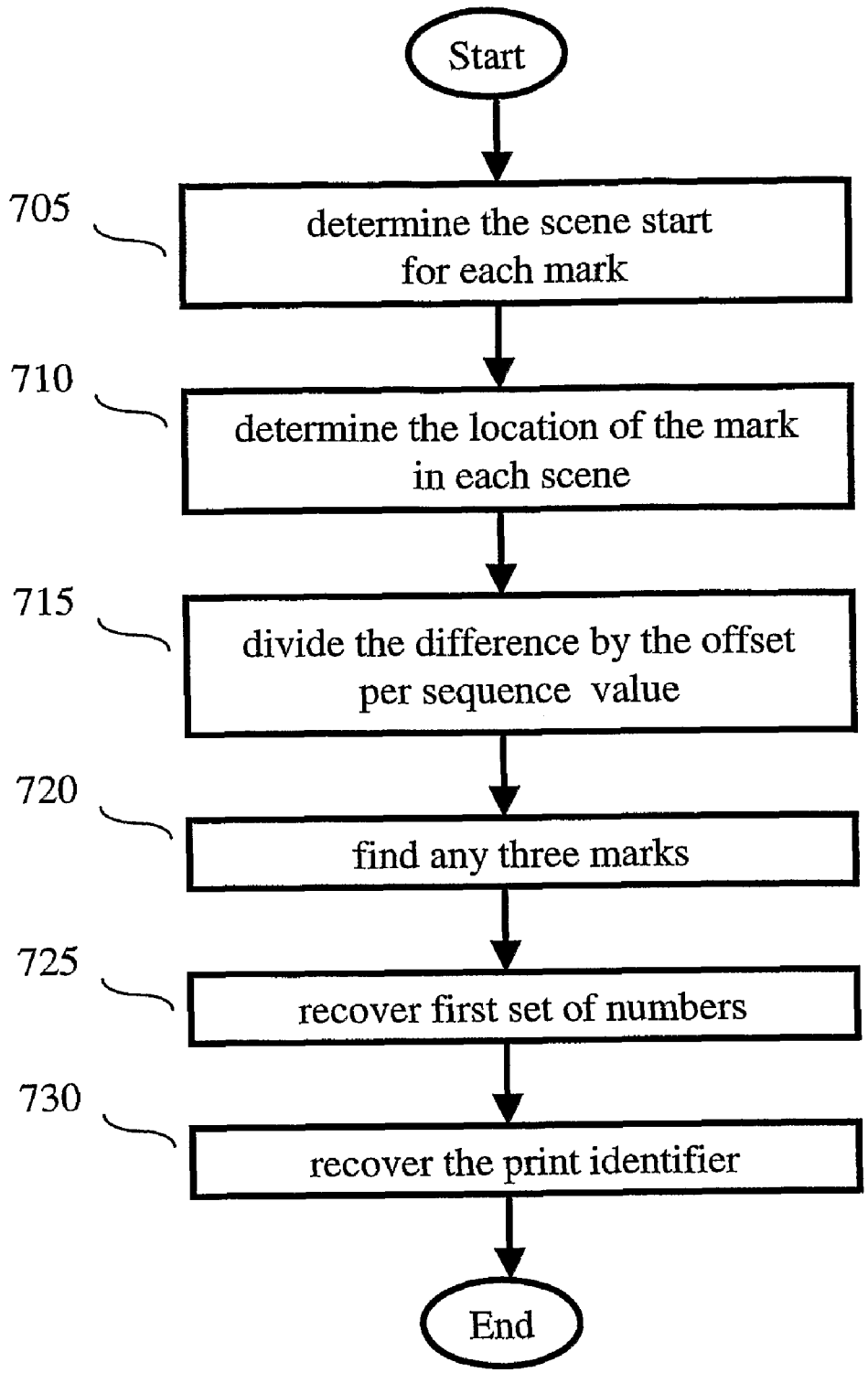
FIG. 7 shows an illustrative flow chart in accordance with the principles of the invention.

When attempting to recover the second set of numbers from the copy of the film using, e.g., the flow chart of FIG. 7, assume that only the numbers Y and Z were found, i.e., X and W are missing. In this example, the flow chart of FIG. 7 is used in conjunction with table two of FIG. 9. From table two, the set of equations in the row associated with the found pair of numbers (here, Y and Z) is used to recover the first set of numbers, as shown below:

$$A=(2*2-5)=-1=30 \bmod 31; \text{ and}$$

$$B=5-2=3.$$

Again, it should be noted that any results from the equations shown in table two are further reduced Mod M. Once the first set of numbers is determined, the print identifier, P, is recovered in accordance with the following equation:

$$P=A+(31*B)+(961*C).$$

In this particular example, $$P=30+31*3=123.$$

Figure 10:
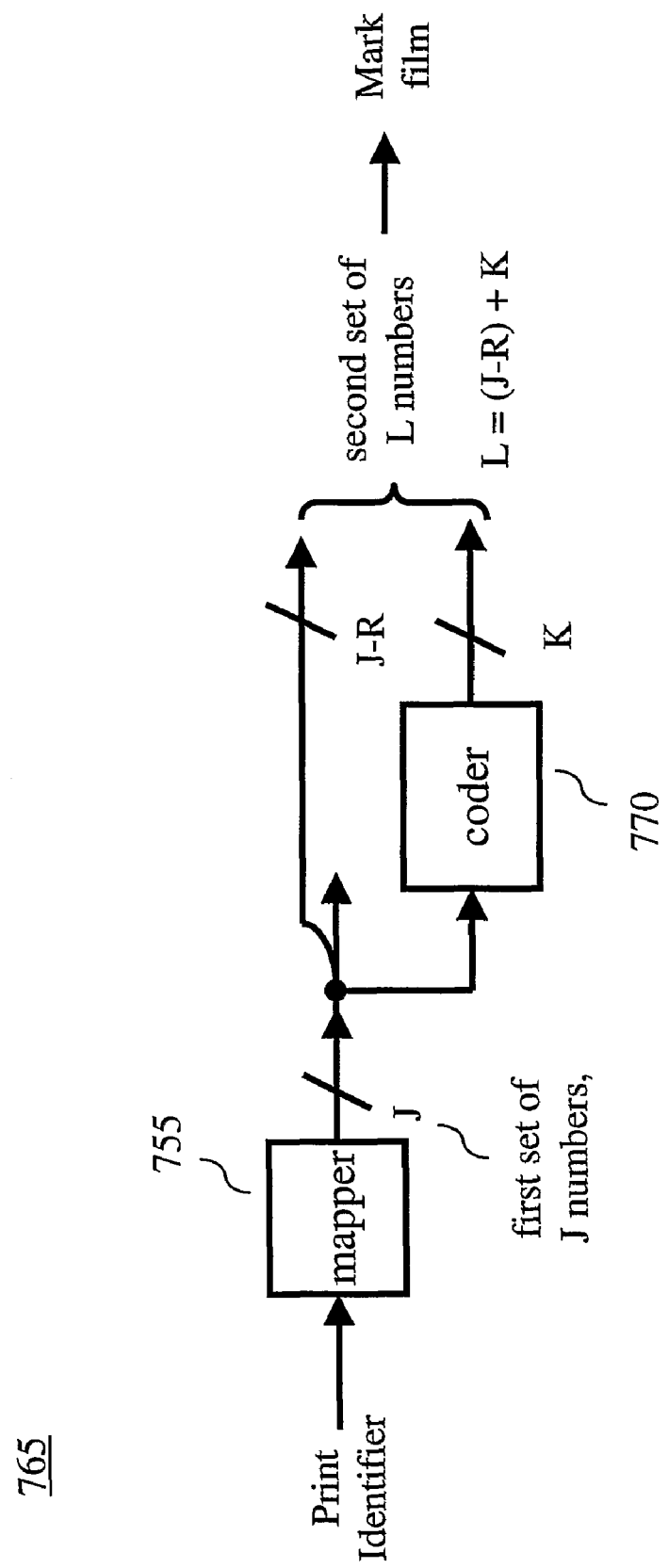
FIGS. 10 and 11 show illustrative encoders for marking film in accordance with the principles of the invention.

An illustrative block diagram of an encoder 765 in accordance with the principles of the invention is shown in FIG. 10. Encoder 765 comprises a mapper 755 and a coder 770. Mapper 755 maps (or encodes) a print identifier into the first set of J numbers. Coder 770 operates on at least a portion of this first set of numbers to provide a number of error correction numbers, K. The second set of L numbers comprises the error correction numbers, K, along with a portion, N, of the first set of numbers, J, where N<J. As a result, $$L=N+K.$$

In other words, R of the numbers (in the first set of J numbers), where R>0, are not shown explicitly as a part of the identifier values but are encoded into the error correction numbers, K. In the context of the examples shown in FIGS. 7, 8 and 9, and described above, J=3, K=2 and R=1 (i.e., the identifier value C was mixed into the values of Y and Z). The second set of numbers represents the sequence of numbers used to mark the copy of the film.

Figure 11:
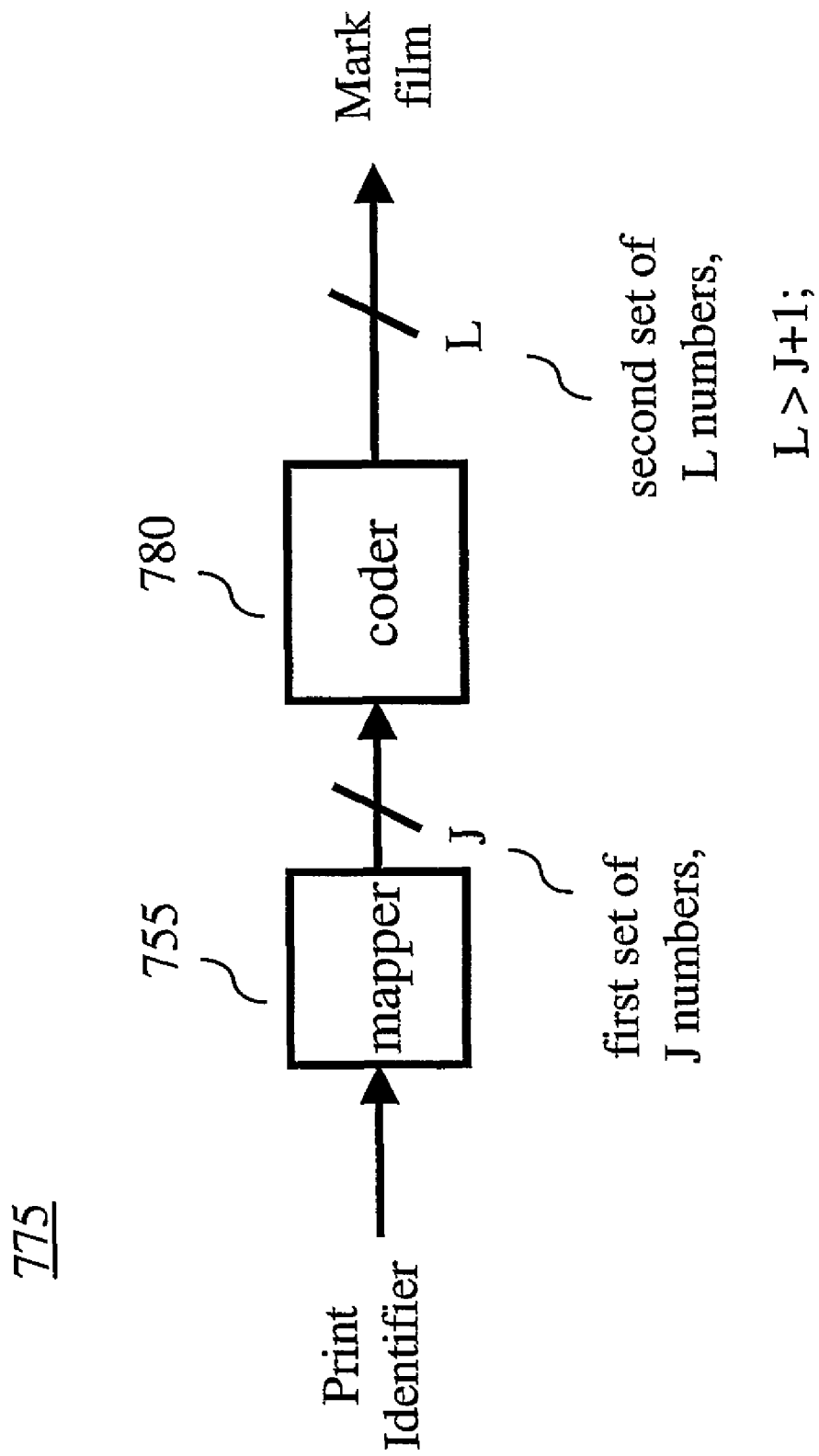

Another more general form of an encoder in accordance with the principles of the invention is shown in FIG. 11. Encoder 775 comprises mapper 755 and coder 780. Mapper 755 maps (or encodes) a print identifier into the first set of J numbers. Coder 780 operates on at least a portion of this first set of numbers to provide the second set of L numbers, where L>J.

Although the error correcting codes illustrated and described herewith are erasure correction codes, it will be clear that the invention is not so limited. In particular, any error detection or correction code could be used, including, for example, Reed-Solomon codes, BCH codes, Hamming codes, or any other desired correction code. In this regard, although the inventive concept was illustrated in the context of recovering from "missing" numbers, the inventive concept also applies to recovering from "corrupted" numbers.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. It is therefore to be understood that numerous modifications may be made to the illustrative embodiments and that other arrangements may be devised without departing from the spirit and scope of the present invention as defined by the appended claims. For example, although illustrated in the context of scenes and sequences, equivalent methods of partitioning a film may be used such as, but not limited to, dividing a film into zones based on film footage, each zone having a predefined film footage and comprising a number of sequences.

The invention claimed is:

1. A method for identifying a copy of a motion picture comprising:

generating a sequence of J numbers representing a film print identifier for the copy of the motion picture;

creating at least two error-correcting numbers, X and Y, each a function of one or more of the J numbers; and marking the copy of the motion picture with at least the two error-correcting numbers X and Y;

wherein the at least two error-correcting numbers make up an erasure-correcting coded serial number having L numbers that enables recovery of a film print identifier associated with the copy of the motion picture if M of the L numbers are subsequently missing, or corrupted.

2. The method of claim 1, wherein the generating step maps the film print identifier for the copy of the motion picture into the sequence of J numbers.

3. The method of claim 1, wherein the at least two error-correcting numbers are represented by marks on various frames of the copy of the motion picture.

4. A method for identifying a copy of a motion picture disposed on a medium comprising the step of:

providing a first set of J numbers, which are associated with a film print identifier of the copy of the motion picture, coding at least a portion of the first set of J numbers to provide a second set of K numbers where K>1; and marking the copy of the motion picture in accordance with a sequence of L numbers, where N of the L numbers are taken from the first set of J, and the remainder of the L numbers comprise the second set of K numbers.

5. The method of claim 4, wherein the L numbers represent an erasure-correcting coded serial number.

6. The method of claim 4, wherein the marking step includes the steps of:

marking respective sequences of the copy of the motion picture in accordance with the N numbers from the first set of J numbers; and marking respective sequences of the copy of the motion picture in accordance with the second set of K numbers.

7. A readable non-transitory medium for storing a motion picture, the motion picture comprising:

a plurality of frames, each frame representing a portion of the motion picture, wherein some of the frames are marked to represent an erasure-correcting coded serial number;

wherein the erasure-correcting coded serial number comprises L numbers, and wherein the erasure-correcting coded serial number enables recovery of a film print identifier associated with the copy of the motion picture if M of the L numbers are subsequently corrupted.

8. Apparatus for identifying a copy of a motion picture, the apparatus comprising:

means for generating a sequence of J numbers representing a film print identifier for the copy of the motion picture;

means for creating at least two error-correcting numbers, X and Y, each a function of one or more of the J numbers; and means for marking the copy of the motion picture with at least the two error-correcting numbers X and Y;

wherein the at least two error-correcting make up an erasure-correcting coded serial number having L numbers that enables recovery of a film print identifier associated with the copy of the motion picture if M of the L numbers are subsequently missing, or corrupted.

9. The apparatus of claim 8, wherein the means for generating maps the film print identifier for the copy of the motion picture into the sequence of J numbers.

10. The apparatus of claim 8, wherein the erasure-correcting coded serial number is represented by identifier marks and an error correction mark on various frames of the copy of the motion picture.

\* \* \* \* \*